United States Patent
Zhang et al.

(10) Patent No.: US 10,893,335 B2
(45) Date of Patent: Jan. 12, 2021

(54) METHOD AND DEVICE FOR PREVIEWING VIDEO PLAYBACK PROGRESS

(71) Applicant: SHENZHEN TCL DIGITAL TECHNOLOGY LTD., Shenzhen (CN)

(72) Inventors: Yingang Zhang, Shenzhen (CN); Xia Zhang, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 315 days.

(21) Appl. No.: 16/061,488

(22) PCT Filed: Jun. 4, 2016

(86) PCT No.: PCT/CN2016/084853
§ 371 (c)(1),
(2) Date: Jun. 12, 2018

(87) PCT Pub. No.: WO2017/107394
PCT Pub. Date: Jun. 29, 2017

(65) Prior Publication Data
US 2020/0267452 A1 Aug. 20, 2020

(30) Foreign Application Priority Data
Dec. 23, 2015 (CN) .......................... 2015 1 0979025

(51) Int. Cl.
*H04N 21/472* (2011.01)
*H04N 21/442* (2011.01)
*H04N 21/6587* (2011.01)

(52) U.S. Cl.
CPC . *H04N 21/47217* (2013.01); *H04N 21/44222* (2013.01); *H04N 21/6587* (2013.01)

(58) Field of Classification Search
None
See application file for complete search history.

(56) References Cited

U.S. PATENT DOCUMENTS

2012/0308205 A1* 12/2012 Gao .................... G06F 16/7328
386/241
2013/0324192 A1* 12/2013 Lee ........................ G11B 27/34
455/557
2014/0325358 A1 10/2014 Yun et al.

FOREIGN PATENT DOCUMENTS

CN 101478680 7/2009
CN 101840435 9/2010
(Continued)

OTHER PUBLICATIONS

European Search Report issued in corresponding European Patent Application No. 16877207.7, dated Apr. 12, 2019 issued in European Patent Office, Munich, Germany.
(Continued)

Primary Examiner — Heather R Jones
(74) Attorney, Agent, or Firm — Hauptman Ham, LLP

(57) ABSTRACT

The present disclosure provides a method and a device for previewing video playback progress, the method includes: detecting user's adjusting of progress position to a target video, and acquiring an adjusted progress section; matching corresponding frame position range according to the progress section; searching a frame difference value corresponding to each of the video frames contained in the frame position range from a pre-established database, and selecting a pre-configured number of frame difference values which are relatively higher from the frame difference values, displaying the multiple video frames corresponding to the pre-configured number of frame difference values searched to user in a preview form. The present disclosure solves the problem of that in existing technology it is unable to rapidly locate to the interesting video content when watching the network video.

7 Claims, 7 Drawing Sheets

(56) References Cited

FOREIGN PATENT DOCUMENTS

| | | |
|---|---|---|
| CN | 102905190 | 1/2013 |
| CN | 103606158 | 2/2014 |
| CN | 104717571 | 6/2015 |
| CN | 104754415 | 7/2015 |
| CN | 104918120 | 9/2015 |
| CN | 105100692 | 11/2015 |
| CN | 105100961 | 11/2015 |
| CN | 105516818 | 4/2016 |
| EP | 1746600 A1 | 1/2007 |
| EP | 2521046 A1 | 11/2012 |
| WO | WO2013056311 | 4/2013 |

OTHER PUBLICATIONS

International search report dated Sep. 21, 2016 from corresponding application No. PCT/CN2016/084853.
Office Action dated Mar. 28, 2018 from corresponding application No. CN 201510979025.5.

\* cited by examiner

METHOD AND DEVICE FOR PREVIEWING VIDEO PLAYBACK PROGRESS

RELATED APPLICATIONS

The present application is a National Phase of International Application Number PCT/CN2016/084853, filed Jun. 4, 2016, and claims the priority of China Application No. 201510979025.5, filed Dec. 23, 2015.

FIELD

This disclosure generally relates to the technical field of network video, and more particularly relates to a method and a device for previewing video playback progress.

BACKGROUND

With the development of the internet technology, network videos are more and more widely played, watching network videos through the internet has gradually become a kind of network video lifestyle of leisure and entertainment.

When watching the plurality of network videos, in order to selectively watch the interesting contents, user would frequently adjust the video playback progress. In the existing technology, user may sometimes miss the interesting video contents if frequently adjusting the video playback progress, which causes that user has to repeatedly adjust the video playback progress, to locate to the interesting video contents. In addition, when in a bad condition of the network, repeatedly adjusting the network video playback progress may cause the video being repeatedly loaded, as such user will wait for a long time, thus resulting an undesirable user experience.

SUMMARY

It is therefore one main object of this disclosure to provide a preview method and device for video playback progress, which aims to realize that representative video frames are previewed, as such user can rapidly locate to the interesting video content, thus satisfying user's requirement.

In order to achieve the above object, the method for previewing video playback progress proposed by this disclosure includes:

detecting user's adjusting of progress position to a target video, acquiring an adjusted progress section, and the progress section is a progress position range between a first progress position at the beginning of triggering and a second progress position at the ending of triggering, or the progress section is a progress position range between a target video's playback start position and a second progress position at the ending of triggering;

matching a first frame position according to the first progress position, and matching a second frame position according to the second progress position, the frame position range is a range between the first frame position and the second frame position, and the first frame position and the second frame position respectively correspond to a video frame, or, matching a start frame position according to the playback start position, and matching a second frame position according to the second progress position, the frame position range is a range between the start frame position and the second frame position, and the start frame position and the second frame position respectively correspond to a video frame;

searching a frame difference value corresponding to each of the video frames contained in the frame position range from a pre-established database, and selecting a pre-configured number of frame difference values which are relatively higher from the frame difference values, the frame difference value being a difference value between any one video frame and its adjacent video frame, the database storing the frame difference values corresponding to all of the video frames in the target video;

displaying the multiple video frames corresponding to the pre-configured number of frame difference values searched to user in a multi-square preview form or a card preview form.

the pre-configured number of frame difference values searched to user The exemplary embodiment of the present disclosure further provides a method for previewing video playback progress which includes:

detecting user's adjusting of progress position to a target video, and acquiring an adjusted progress section;

matching a corresponding progress position range according to the progress section;

searching a frame difference value corresponding to each of the video frames contained in the frame position range from a pre-established database, and selecting a pre-configured number of frame difference values which are relatively higher from the frame difference values, the frame difference value being a difference value between any one video frame and its adjacent video frame, the database storing the frame difference values corresponding to all of the video frames in the target video;

displaying the multiple video frames corresponding to the pre-configured number of frame difference values searched to user in a preview form.

The exemplary embodiment of the present disclosure further provides a device for previewing video playback progress, the device includes:

a detecting module, configured to detect user's adjusting of progress position to a target video, and acquiring an adjusted progress section;

a matching module, configured to match a corresponding progress position range according to the progress section;

a searching module, configured to search a frame difference value corresponding to each of the video frames contained in the frame position range from a pre-established database, and select a pre-configured number of frame difference values which are relatively higher from the frame difference values, in which the frame difference value is a difference value between any one video frame and its adjacent video frame, the database stores the frame difference values which correspond to all of the video frames in the target video; and a displaying module, configured to display the multiple video frames corresponding to the pre-configured number of frame difference values searched to user in a preview form.

The present disclosure provides a method and a device for previewing o playback progress, user's adjusting of progress position to a target video is detected, to acquire the adjusted progress section; the corresponding progress position range is matched according to the progress section; a frame difference value corresponding to each of the video frames contained in the frame position range is searched out from a pre-established database, and the pre-configured number of frame difference values which are relatively higher are selected from the frame difference values; the multiple video frames corresponding to the searched and pre-configured number of frame difference values are displayed to user in the preview form. Therefore, the problem of that in existing technology it is unable to rapidly locate to the interesting video content when watching the network video is solved, and previewing the representative video frame is realized, as such user can rapidly locate to the interesting video content, to satisfy user's requirement.

Various implementations, functional features, and advantages of this disclosure will now be described in further detail in connection with some illustrative embodiments and the accompanying drawings.

DETAILED DESCRIPTION OF THE EMBODIMENTS

It is to be understood that, the described embodiments are only some exemplary embodiments of the present disclosure, and the present disclosure is not limited to such embodiments.

The mainly technical solution of the exemplary embodiment of the present disclosure is: detecting user's adjusting of progress position to a target video, and acquiring an adjusted progress section; matching corresponding frame position range according to the progress section; searching a frame difference value corresponding to each of the video frames contained in the frame position range from a pre-established database, and selecting a pre-configured number of frame difference values which are relatively higher from the frame difference values; displaying the multiple video frames corresponding to the pre-configured number of frame difference values searched to user in a preview form. Therefore, the problem of that in existing technology it is unable to rapidly locate to the interesting video content when watching the network video is solved, and previewing the representative video frame is realized, as such user can rapidly locate to the interesting video content, to satisfy user's requirement.

Figure 1:
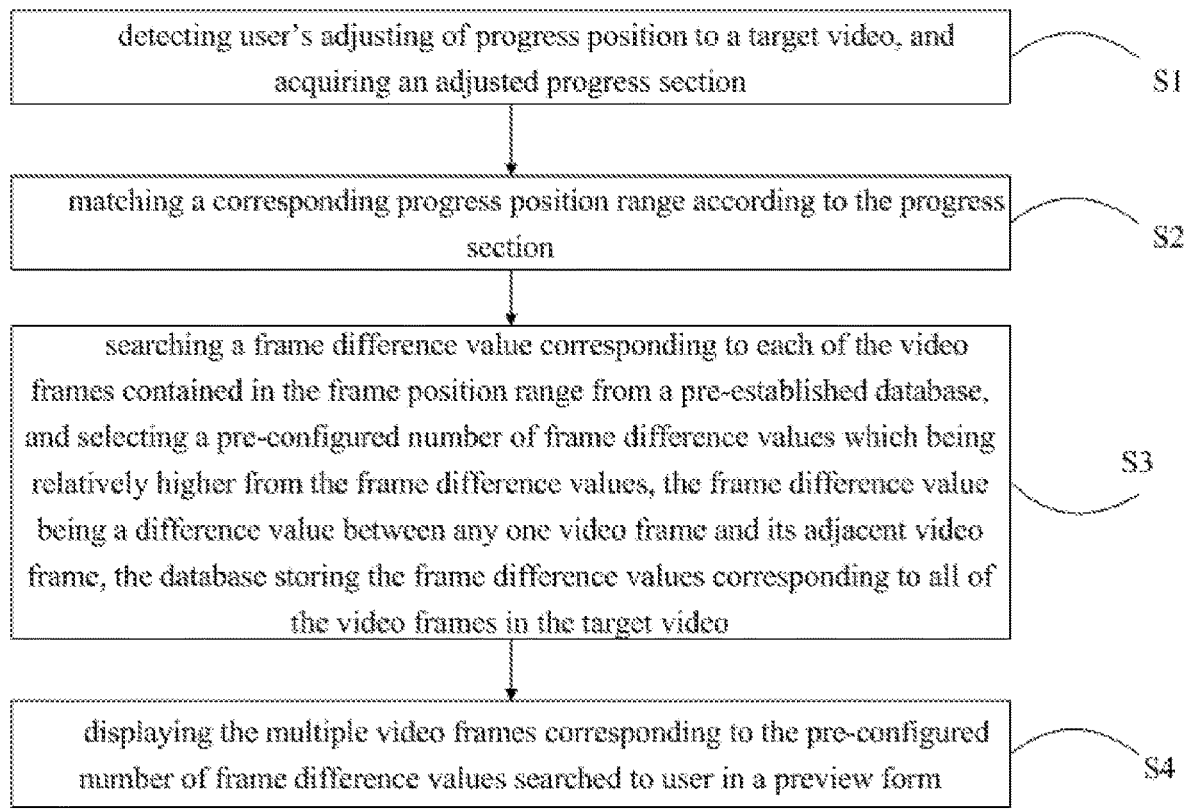
FIG. 1 is a flow chart of a method for previewing video playback progress of the present disclosure according to a first exemplary embodiment.

Referring to FIG. 1, the first exemplary embodiment of the present disclosure provides a method for previewing video playback progress, which includes:

Step S1, detecting user's adjusting of progress position to a target video, and acquiring an adjusted progress section;

The executive body of the method in the disclosure can be a data processing device or a server, the exemplary embodiment takes the server as an example, and other multimedia data processing devices which are able to preview the video playback progress are not limited.

In detail, server detects user's adjusting of progress position to the target video, and acquires the adjusted progress section.

And, user can adjust the target video's playback progress position by dragging the target video's playback progress bar, key operation, or another operation modes which can adjust the playback progress position, so as to realize the adjustment to the target video's progress position.

And, when user's adjusting of progress position to the target video is detected, server acquires a progress section corresponding to the adjustment to the target video's progress position, and records the progress positions before and after adjustment.

The progress section in the present disclosure can be a progress position range between a first progress position at the beginning of triggering and a second progress position at the ending of triggering which are operated by user, or a progress position range between target video's playback start position and a second progress position at the ending of triggering.

Step S2, matching a corresponding frame position range according to the progress section.

In detail, after server successfully detects user's adjusting of progress position to the target video, and acquires the adjusted progress section, server matches out the corresponding frame position range according to the progress section.

And, server matches out the frame position corresponding to the progress position according to the progress positions before and after adjustment, and then a frame position range corresponding to the progress section obtained by user's adjustment to the video progress is match out.

When the progress section is a progress position range between the first progress position at the beginning of triggering and the second progress position at the ending of triggering which are operated by user, the realization mode for matching the corresponding frame position range according to the progress section can be:

a. when user plays the target video, server detects that user adjusts the progress of the target video from the first progress position to the second progress position, respectively records the first progress position as P1, and the second progress position as P2;

b. a first frame position F1 is matched out according to the first progress position P1, and a second frame position F2 is matched out according to the second progress position P2, the frame position range is a range between the first frame position F1 and the second frame position F2, for example: server can use a proportional relation formula between the progress position and the total time of video:

$$F/\text{total frames} = P/\text{total time of video};$$

to calculate, so as to obtain the first frame position F1 corresponding to the first progress position P1 and the second frame position F2 corresponding to the second progress position P2, the frame position range is the range between the first frame position F1 and the second frame position F2.

Similarly, when the progress section is a progress position range between target video's playback start position and a second progress position at the ending of triggering, the frame position range is calculated.

Step S3, searching a frame difference value corresponding to each of the video frames contained in the frame position range from a pre-established database, and selecting a pre-configured number of frame difference values which are relatively higher from the frame difference values, the frame difference value is a difference value between any one video frame and its adjacent video frame, the database stores the frame difference values corresponding to all of the video frames in the target video.

In detail, after the corresponding frame position range is successfully matched out according to the progress section, server searches the frame difference value corresponding to each of the video frames contained in the frame position range from the pre-established database, and selects the pre-configured number of frame difference values which are relatively higher from the frame difference values.

And, the preset database, can be an array, a table, or other storing structures having other formats, the exemplary embodiment takes the single array as example to illustrate.

And, the frame difference value, is defined as a difference value between any one video frame and a previous and adjacent video frame in the target video, the value of the frame difference value can be used for presenting frame difference degree of the two adjacent video frame, the frame difference value is larger, the frame difference degree is bigger, and the frames are more representative; the frame difference value is smaller, the frame difference degree is also smaller.

And, server acquires the total frames of the video frames contained in the target video, to establish an linear array having an initialization of null and a length equal to the total frames of the video frames, the linear array can be used for storing the frame difference values corresponding to all of the video frames contained in the target video; when user plays the target video, server acquires a buffered video frame sequence, and then calculates an image difference value between two adjacent video frames contained in the buffered video frame sequence, finally calculates the variance of the image difference value of the two adjacent video frames to obtain the frame difference value.

The following mode can be adopted when carrying out the embodiment:

a. server acquires the total frames of the video frames contained in the target video, and allots the target video a linear array, the array can be defined as Label, and sets the length of the array Label as the total frames of the video frames, and the initialization of the array Label is null;

b. when user plays the target video, server acquires the buffered video frame sequence in the current target video, and the buffered video frame sequence is defined V;

c. server calculates the image difference values between all two adjacent video frames in the video frame sequence V;

d. server calculates the variance of the image difference value between two adjacent video frames to obtain the corresponding frame difference value;

e. server stores the calculated frame difference values in corresponding position in the array.

Such as, the total frames of the target video is 1000 frames, and the length of the array Label is 1000, and the initialization is null; and, if assuming the buffered video frame sequence is 10 frames, and the video frame sequence is defined as V[10]; when calculating the frame difference value of the $i^{th}$ frame, V[i] can be used to subtract V[i], so as to obtain the image difference value first, and then the variance of the image difference value is calculated to obtain the frame difference value M of the $i^{th}$ frame; the $i^{th}$ frame is set at the $F^{th}$ frame position in the target video, and the frame difference value M is stored at the corresponding position Label[F], that is, Label[F]=M.

And, the length of the array Label is limited, after every value of the array Label is assigned with a value, the video similarity learning process of the server ends.

And, taking as a special case, when user starts to play the target video, server will detect that the array Label is a null frame; at this time, server will send the frame number to user randomly; after user receives the frame number, when user buffers the target video subsequently, server would detect whether the sent frame number is contained in, if yes, the frame difference value corresponding to the video frame is calculated according to the above method for calculating the frame difference value, and then the frame difference value is stored in corresponding position in the array Label.

And, server selects a pre-configured number of frame difference values which are relatively higher from the preset array, according to the frame position corresponding to the matched progress position, and the number of frame difference values selected by server which are relatively higher can be set by user own-self and according to user's preference, or can also be pre-set by server.

The following mode can be adopted when carrying out the embodiment:

The progress of the target video can be adjusted by user from the first progress position P1 to the second progress position P2, and the frame position corresponding to the first progress position P1 is defined as F1, the frame position corresponding to the second progress position P2 is defined as F2.

At the same time, the frame position corresponding to the start progress position P0 of the target video is defined as F0; the number of highest frame difference values set by user own-self is n.

The first embodiment:

Server acquires n frame difference values which are higher from Label[F0] to Label[F2] in the preset array Label, according to the frame position F2 corresponding to the second progress position P2 and the frame position F0 corresponding to the start progress position P0.

The second embodiment:

Server acquires n frame difference values which are higher from Label[F1] to Label[F2] in the preset array Label, according to the frame position F1 corresponding to the first progress position P1 and the frame position F2 corresponding to the second progress position P2.

Step S4, displaying the multiple video frames corresponding to the pre-configured number of frame difference values searched to user in the preview form.

In detail, after the pre-configured number of frame difference values which are relatively higher and contained in the frame difference values corresponding to the video frames in the frame position range, are successfully selected from the preset database, server displays the plurality of searched video frames corresponding to the pre-configured number of frame difference values to user in the preview form.

And, server matches out corresponding video frames from the database according to the acquired pre-configured number of frame difference values, and then displays the corresponding video frames in the form of preview box, the display form of preview box can be a matrix form of the multi-square form, or the horizontal or vertical alignment form of the card form, or other preview display forms which can preview the multiple video frames simultaneously.

And, the do-gong number of the matrix form of the multi-square form, can be confirmed according to the value of the preset n, such as, if n is lesser than or equal to 4, a four do-gong matrix is displayed; if n is greater than 4, and lesser than or equal to 9, a nine do-gong matrix is displayed; if n is greater than 9, and lesser than or equal to 16, a sixteen do-gong matrix is displayed.

And, when user selects one video frame displayed in the preview box, the target video jumps to and displays from the progress position corresponding to the video frame.

And, when user selects one previewed video frame, server further previews the video frames in a topology structure mode, through the above form for previewing the video frames.

The following mode can be adopted when carrying out the embodiment:

After the progress of the target video can be adjusted by user from the first progress position P1 to the second progress position P2, the progress position of the video frame selected from the video frames in the preview box is defined as P3, and the frame position corresponding to the first progress position P1 is defined as F1, the frame position corresponding to the second progress position P2 is defined as F2, the frame position corresponding to the progress position P3 of the video frame selected by user is defined as F3.

At the same time, the frame position corresponding to the start progress position P0 of the target video is defined as F0; the number of highest frame difference values set by user own-self is n.

The first embodiment:

Server acquires n frame difference values which are higher from Label[F0] to Label[F3] in the preset array Label, according to the frame position F3 corresponding to the progress position P3 of the video frame selected by user and the frame position F0 corresponding to the start progress position P0; then the n video frames corresponding to the acquired frame difference values are previewed.

The second embodiment:

Server acquires n frame difference values which are higher from Label[F1] to Label[F3] in the preset array Label, according to the frame position F1 corresponding to the first progress position P1 and the frame position F3 corresponding to the progress position P3 of the video frame selected by user; then the n video frames corresponding to the acquired frame difference values are previewed.

The third embodiment:

Server acquires n frame difference values which are higher from Label[F3] to Label[F2] in the preset array Label, according to the frame position F3 corresponding to the progress position P3 of the video frame selected by user and the frame position F2 corresponding to the second progress position P2; then the n video frames corresponding to the acquired frame difference values are previewed.

And, the form for further previewing the video frame through the topology structure mode can be, a new multi-square matrix preview box which is generated near to the original multi-square matrix preview box; or, a new horizontal or vertical card preview box which is generated near to the horizontal or vertical card preview box.

Through the above technical solution, the present disclosure provides a method for previewing the video through the video frame difference, and previewing the representative video frame is realized, as such user can rapidly locate to the interesting video content, to satisfy user's requirement.

Figure 2:
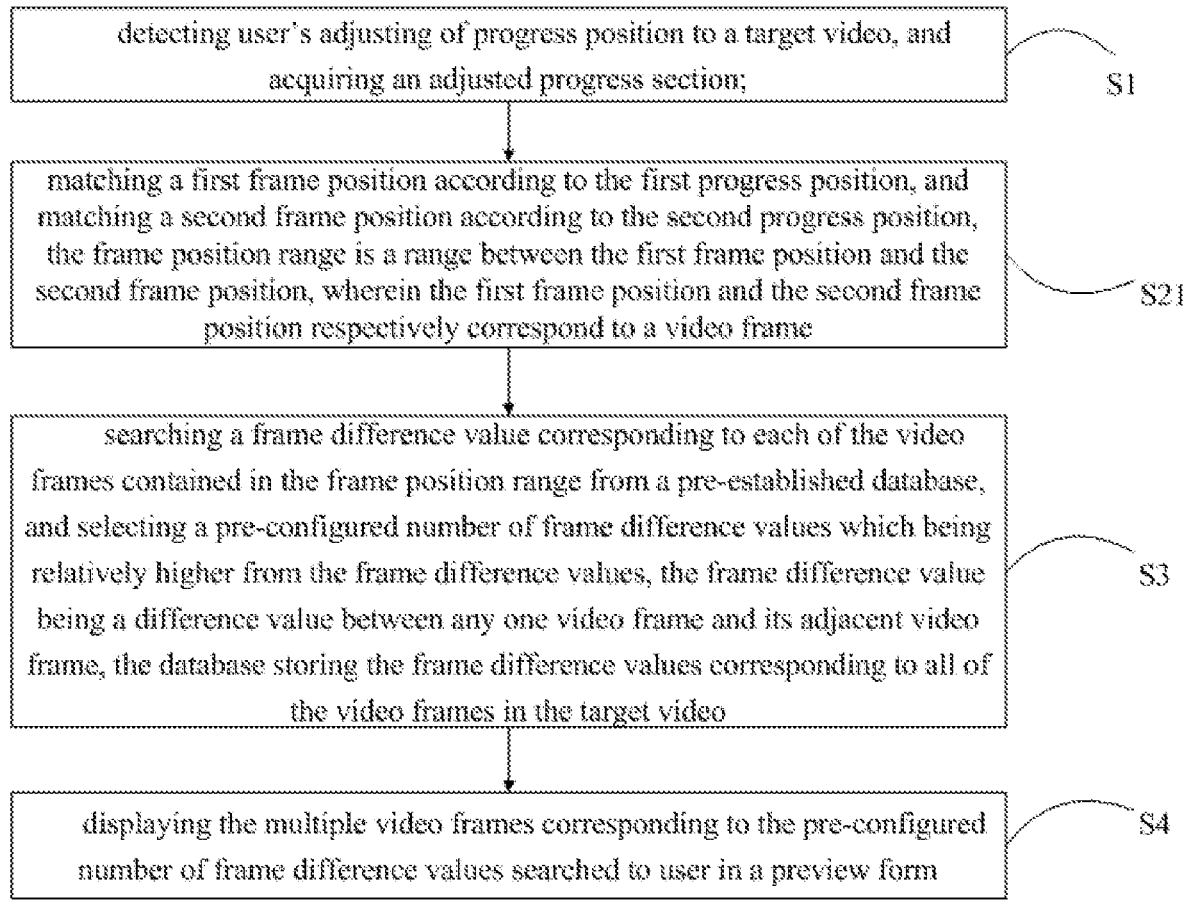
FIG. 2 is a flow chart of a first embodiment in the exemplary embodiment of the present disclosure.
Figure 3:
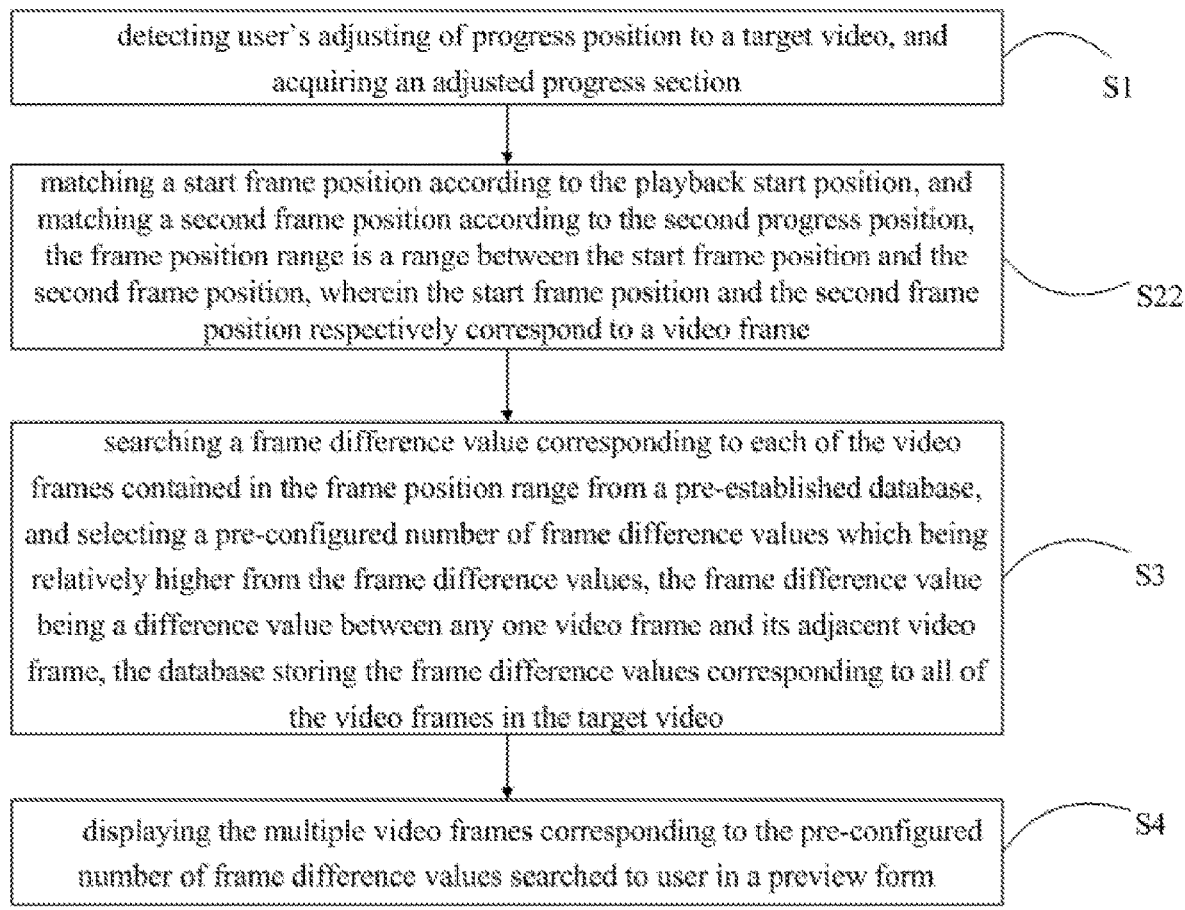
FIG. 3 is a flow chart of a second embodiment in the exemplary embodiment of the present disclosure.

Furthermore, in order to realize the previewing the video through the video frame difference much better, referring to FIG. 2, which is an embodiment of the exemplary embodiment of the present disclosure, based on the first exemplary embodiment, the embodiment further includes:

Step S21, a first frame position is matched out according to the first progress position, and a second frame position is matched out according to the second progress position, the frame position range is a range between the first frame position and the second frame position, and the first frame position and the second frame position respectively correspond to one video frame.

In detail, after server successfully detects user's adjusting of progress position to the target video, and acquires the adjusted progress section, server matches out the first frame position according to the first progress position, and matches out the second frame position according to the second progress position, so as to match out the frame position range corresponding to the progress section acquired by user's adjustment to the video progress.

The following mode can be adopted when carrying out the embodiment:

a. when user plays the target video, server detects that user adjusts the progress of the target video from the first progress position to the second progress position, respectively records the first progress position as P1, and the second progress position as P2;

b. a first frame position F1 is matched out according to the first progress position P1, and a second frame position F2 is matched out according to the second progress position P2, the frame position range is a range between the first frame position F1 and the second frame position F2, for example: server can use a proportional relation formula between the progress position and the total time of video:

$$F/\text{total frames} = P/\text{total time of video};$$

to calculate, so as to obtain the first frame position F1 corresponding to the first progress position P1 and the second frame position F2 corresponding to the second progress position P2, the frame position range is the range between the first frame position F1 and the second frame position F2.

Based on the implementing of Step S21, after the first frame position and the second frame position are successfully matched out, server acquires a pre-configured number of frame difference values which are relatively higher from the preset database, according to the first frame position and the second frame position which are obtained through matching.

The following mode can be adopted when carrying out the embodiment:

The progress of the target video can be adjusted by user from the first progress position P1 to the second progress position P2, and the frame position corresponding to the first progress position P1 is defined as F1, the frame position corresponding to the second progress position P2 is defined as F2.

At the same time, the number of highest frame difference values set by user own-self is n.

At this time, server acquires n frame difference values which are higher from Label[F1] to Label[F2] in the preset array Label, according to the frame position F1 corresponding to the first progress position P1 and the frame position F2 corresponding to the second progress position P2.

Through the above technical solution, the present disclosure provides a method for previewing the video through the video frame difference, and previewing the representative video frame is realized much better, as such user can rapidly locate to the interesting video content, to satisfy user's requirement.

Furthermore, in order to realize the previewing the video through the video frame difference much better, referring to FIG. 2, which is another embodiment of the exemplary embodiment of the present disclosure, based on the first exemplary embodiment, the embodiment further includes:

Step S22, a start frame position is matched out according to the playback start position, and a second frame position is matched out according to the second progress position, the frame position range is a range between the start frame position and the second frame position, and the start frame position and the second frame position respectively correspond to one video frame.

In detail, after server successfully detects user's adjusting of progress position to the target video, and acquires the adjusted progress section, server matches out the start frame position according to the playback start position, and matches out the second frame position according to the second progress position, so as to match out the frame position range corresponding to the progress section acquired by user's adjustment to the video progress.

The following mode can be adopted when carrying out the embodiment:

a. when user plays the target video, server detects that user adjusts the progress of the target video from the first progress position to the second progress position, respectively records the start progress position as P0, and the second progress position as P2;

b. a start frame position F0 is matched out according to the start progress position P0, and a second frame position F2 is matched out according to the second progress position P2, the frame position range is a range between the first frame position F1 and the second frame position F2, for example: server can use a proportional relation formula between the progress position and the total time of video:

$$F/\text{total frames} = P/\text{total time of video};$$

to calculate, so as to obtain the start frame position F0 corresponding to the start progress position P0 and the second frame position F2 corresponding to the second progress position P2, the frame position range is the range between the first frame position F1 and the second frame position F2.

Based on the implementing of Step S22, after the start frame position and the second frame position are successfully matched out, server acquires a pre-configured number of frame difference values which are relatively higher from the preset database, according to the start frame position and the second frame position which are obtained through matching.

The following mode can be adopted when carrying out the embodiment:

The progress of the target video can be adjusted by user from the first progress position P1 to the second progress position P2, and the frame position corresponding to the second progress position P2 is defined as F2.

At the same time, the number of highest frame difference values set by user own-self is n.

At this time, server acquires n frame difference values which are higher from Label[F0] to Label[F2] in the preset array Label, according to the start frame position F0 corresponding to the playback start position P0 and the frame position F2 corresponding to the second progress position P2.

Through the above technical solution, the present disclosure provides a method for previewing the video through the video frame difference, and previewing the representative video frame is realized much better, as such user can rapidly locate to the interesting video content, to satisfy user's requirement.

Figure 4:
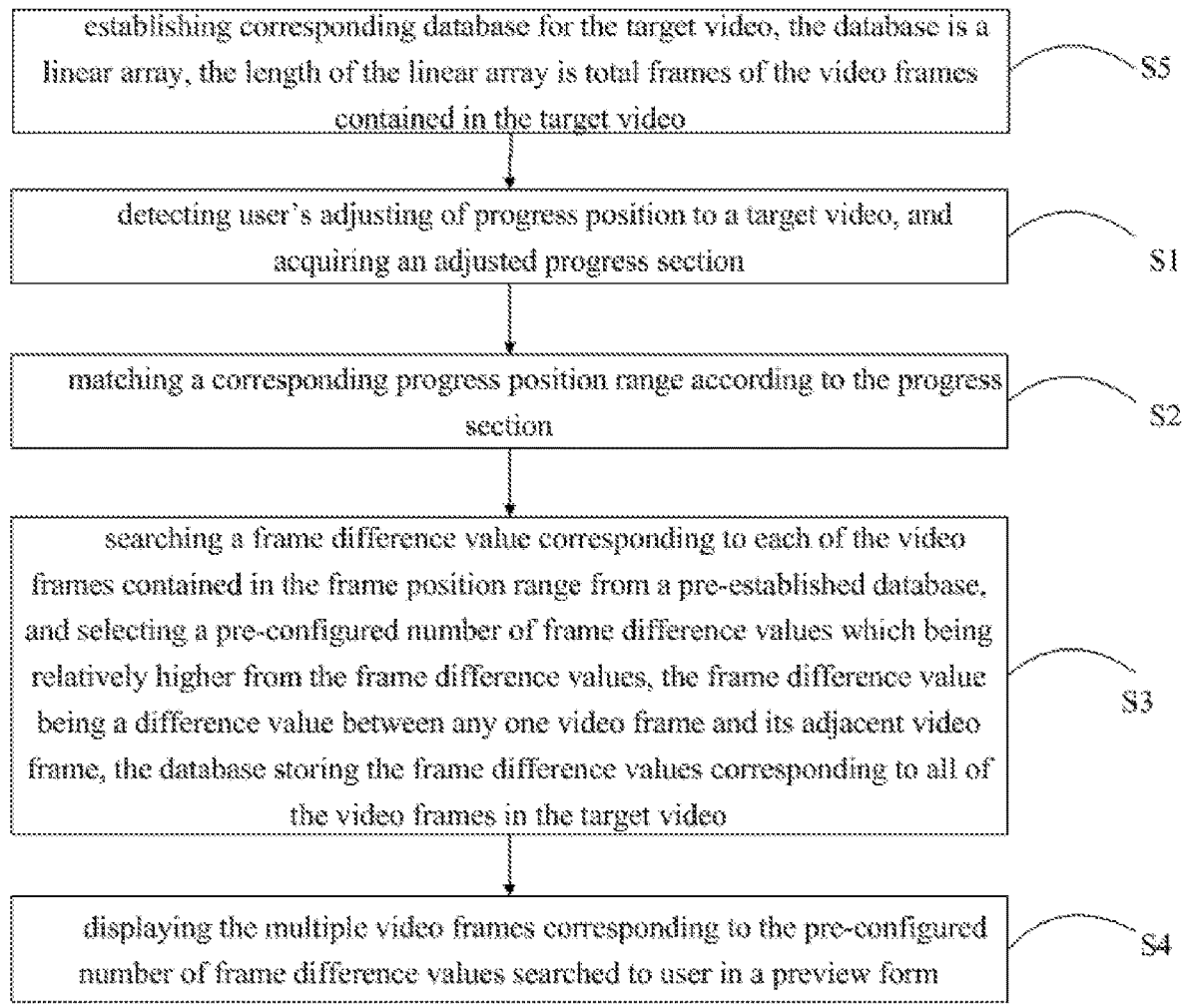
FIG. 4 is a flow chart of a method for previewing video playback progress of the present disclosure according to a second exemplary embodiment.

Referring to FIG. 4, a method for previewing video playback progress of the present disclosure according to a second exemplary embodiment, before based on the step S1 of the first exemplary embodiment shown in FIG. 1, further includes:

Step S5, the database corresponding to the target video is established, the database can be a linear array, the length of the linear array is the total frames of the video frames contained in the target video.

In detail, server establishes the corresponding database for the target video, the database is a linear array, the length of the linear array is the total frames of the video frames contained in the target video.

And, server acquires the total frames of the video frames contained in the target video, to establish an linear array having an initialization of null and a length equal to the total frames of the video frames, the linear array can be used for storing the frame difference values corresponding to all of the video frames contained in the target video; when user plays the target video, server acquires a buffered video frame sequence, and then calculates an image difference value between two adjacent video frames contained in the buffered video frame sequence, finally calculates the variance of the image difference value of the two adjacent video frames to obtain the frame difference value.

The following mode can be adopted when carrying out the embodiment:

a. server acquires the total frames of the video frames contained in the target video, and allots the target video a linear array, the array can be defined as Label, and sets the length of the array Label as the total frames of the video frames, and the initialization of the array Label is null;

b. when user plays the target video, server acquires the buffered video frame sequence in the current target video, and the buffered video frame sequence is defined V;

c. server calculates the image difference values between all two adjacent video frames in the video frame sequence V;

d. server calculates the variance of the image difference value of two adjacent video frames to obtain the corresponding frame difference value;

e. server stores the calculated frame difference values in corresponding position in the array.

Such as, the total frames of the target video is 1000 frames, and the length of the array Label is 1000, and the initialization is null; and, if assuming the buffered video frame sequence is 10 frames, and the video frame sequence is defined as V[10]; when calculating the frame difference value of the $i^{th}$ frame, V[i] can be used to subtract V[i], so as to obtain the image difference value first, and then the variance of the image difference value is calculated to obtain the frame difference value M of the $i^{th}$ frame; the $i^{th}$ frame is set at the $F^{th}$ frame position in the target video, and the frame difference value M is stored at the corresponding position Label[F], that is, Label [F]=M.

And, the length of the array Label is limited, after every value of the array Label is assigned with a value, the video similarity learning process of the server ends.

And, taking as a special case, when user starts to play the target video, server will detect that the array Label is a null frame; at this time, server will send the frame number to user randomly; after user receives the frame number, when user buffers the target video subsequently, server would detect whether the sent frame number is contained in, if yes, the frame difference value corresponding to the video frame is calculated according to the above method for calculating the frame difference value, and then the frame difference value is stored in corresponding position in the array Label.

Through the above technical solution, the present disclosure provides a method for previewing the video through the video frame difference, and previewing the representative video frame is realized much better, as such user can rapidly locate to the interesting video content, to satisfy user's requirement.

Figure 5:
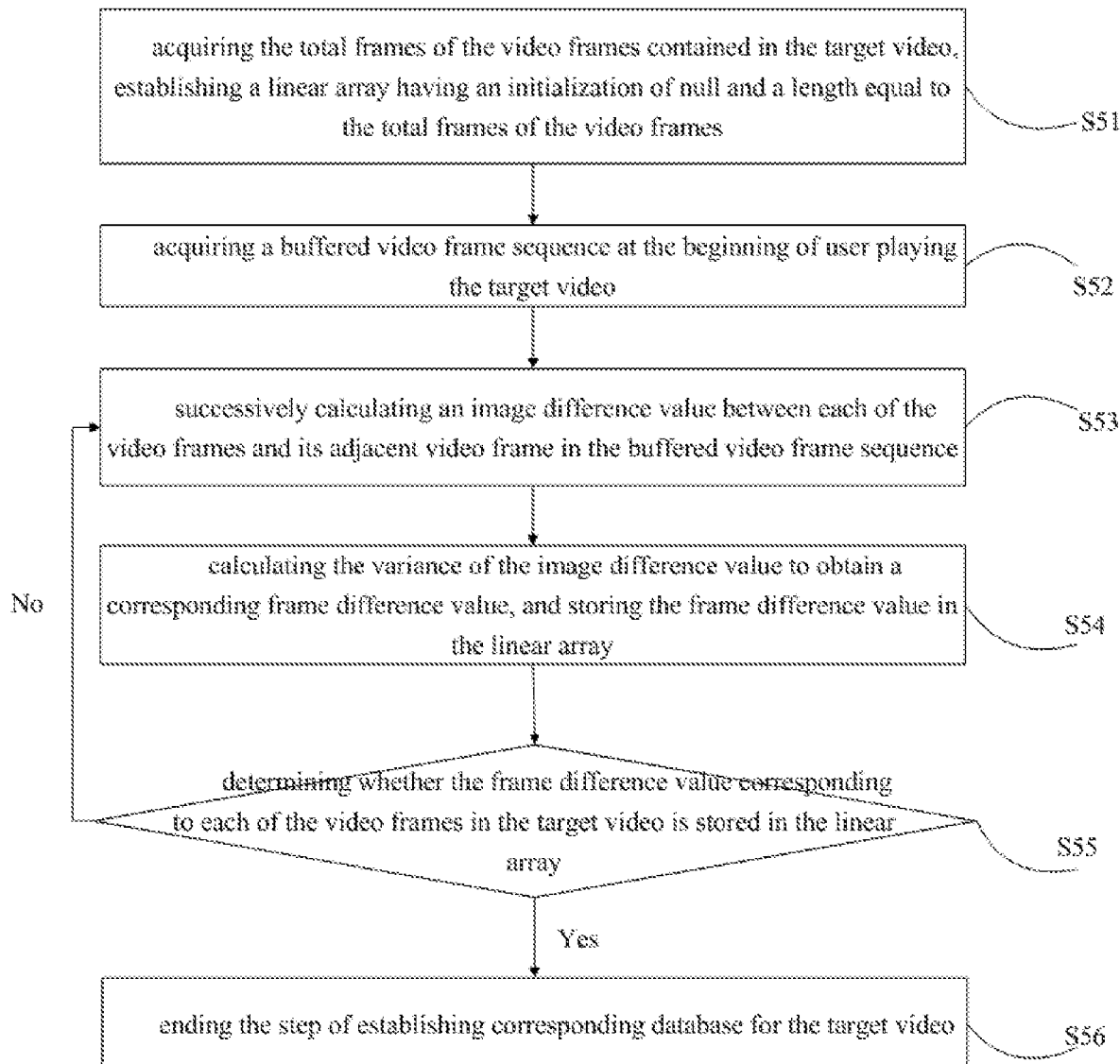
FIG. 5 is a flow chart of establishing corresponding database for the target video in the exemplary embodiment of the present disclosure.

Furthermore, in order to realize the previewing the video through the video frame difference much better, referring to FIG. 5, which is an embodiment of establishing corresponding database for the target video in the exemplary embodiment of the present disclosure, which includes:

Step S51, acquiring the total frames of the video frames contained in the target video, establishing a linear array having an initialization of null and a length equal to the total frames of the video frames.

In detail, server acquires the total frames of the video frames contained in the target video, and establishes the linear array, and the initialization of the linear array is null, and the length of the linear array is the total frames of the video frames contained in the target video.

The following mode can be adopted when carrying out the embodiment:

Server acquires the total frames of the video frames contained in the target video, and allots the target video a linear array, the array can be defined as Label, and sets the length of the array Label as the total frames of the video frames, and the initialization of the array Label is null;

Step S52, acquiring the buffered video frame sequence in the target video at the beginning of user playing the target video.

In detail, after the linear array is successfully established, and the initialization of the linear array is null, and the length of the linear array is the total frames of the video frames contained in the target video, server acquires the buffered video frame sequence in the target video.

Step S53, successively calculating an image difference value between each of the video frames and its adjacent video frame in the buffered video frame sequence;

In detail, after successfully acquiring the buffered video frame sequence in the target video, server calculates an image difference value between two adjacent video frames contained in the buffered video frame sequence.

The following mode can be adopted when carrying out the embodiment:

It is set that the buffered video frame sequence has 10 frames, the video frame sequence is defined as V[10]; when calculating the frame difference value of the $i^{th}$ frame, V[i] can be used to subtract V[i], so as to obtain the image difference value.

Step S54, calculating the variance of the image difference value to obtain the corresponding frame difference value, and storing the frame difference value in the linear array.

In detail, after successfully calculating the image difference value between two adjacent video frames contained in the buffered video frame sequence, server calculates the variance of the image difference value between two adjacent video frames, to obtain the frame difference value.

The following mode can be adopted when carrying out the embodiment:

The variance of the image difference value is calculated to obtain the frame difference value M of the $i^{th}$ frame; the $i^{th}$ frame is set at the $F^{th}$ frame position in the target video, and the frame difference value M is stored in the corresponding position Label[F], that is, Label[F]=M.

Step S55, determining whether the frame difference value corresponding to each of the video frames in the target video is stored in the linear array; if no, executing the step of calculating the frame difference value repeatedly; if yes, ending the step of establishing corresponding database for the target video.

In detail, after the frame difference values are successfully stored, server determines that whether the frame difference value corresponding to each of the video frames in the target video is stored in the linear array, if no, the step of calculating the frame difference value is executed again; if yes, the step of establishing corresponding database for the target video ends.

And, if server determines that the frame difference value corresponding to each of the video frames in the target video is not stored in the linear array, go to the step S53; if server determines that the frame difference value corresponding to each of the video frames in the target video has been stored in the linear array, go to the step S56, the step of establishing corresponding database for the target video ends.

In addition, before executing the calculating step, server determines that whether user's using environment and the calculating amount would cause the timeout. If no, the step of allotting a preset array to the target video is executed, if yes, the allotting step is not executed; the above user's using environment includes external environmental factors, such as, temperature, humidity, etc., which would affect the device used for displaying the video.

Through the above technical solution, the present disclosure provides a method for previewing the video through the video frame difference, and previewing the representative video frame is realized much better, as such user can rapidly locate to the interesting video content, to satisfy user's requirement.

Figure 6:
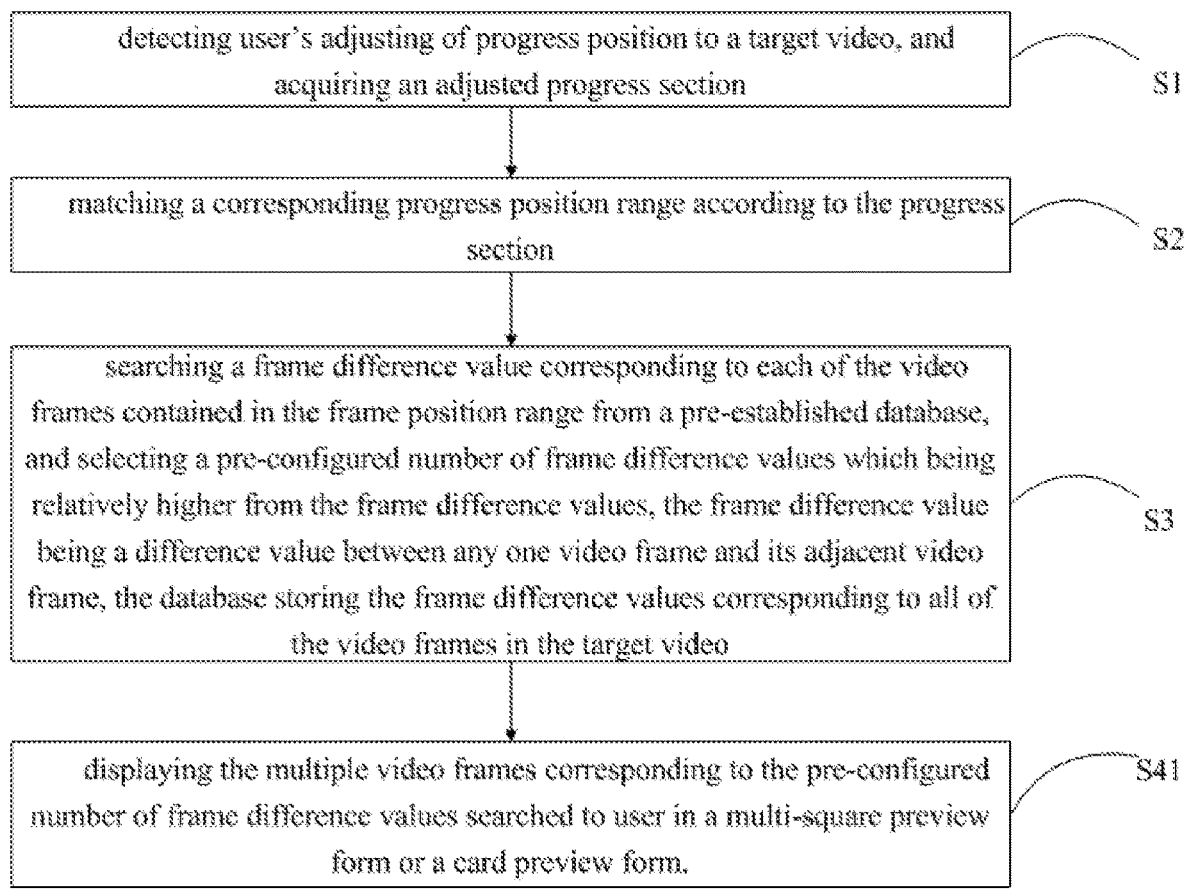
FIG. 6 is a flow chart of displaying the multiple video frames corresponding to the pre-configured number of frame difference values searched to user in a preview form in the exemplary embodiment of the present disclosure.

Furthermore, in order to preview the video by the video frame difference much better, referring to FIG. 6, the embodiment of displaying the multiple video frames corresponding to the pre-configured number of frame difference values searched to user in a preview form, which is in an exemplary embodiment of the present disclosure, includes:

Step S41, displaying the multiple video frames corresponding to the pre-configured number of frame difference values searched to user in a multi-square preview form or a card preview form.

In detail, based on the implementing of the above method, after the pre-configured number of frame difference values, which are relatively higher and contained in the frame difference values corresponding to the video frames in the frame position range, are successfully selected from the preset database, server displays the plurality of searched video frames corresponding to the pre-configured number of frame difference values to user in the multi-square preview form or the card preview form.

And, server matches out corresponding video frames from the database according to the acquired pre-configured number of frame difference values, and then displays the corresponding video frames in the form of preview box, the display form of preview box can be a matrix form of the multi-square form, or the horizontal or vertical alignment form of the card form, or other preview display forms which can preview the multiple video frames simultaneously.

And, when user selects one video frame displayed in the preview box, the target video jumps to and displays from the progress position corresponding to the video frame.

And, when user selects one previewed video frame, server further previews the video frames in a topology structure mode, through the above form for previewing the video frames.

The following mode can be adopted when carrying out the embodiment:

After the progress of the target video can be adjusted by user from the first progress position P1 to the second progress position P2, the progress position of the video frame selected from video frames displayed in the preview box is defined as P3, and the frame position corresponding to the first progress position P1 is defined as F1, the frame position corresponding to the second progress position P2 is defined as F2, the frame position corresponding to the progress position P3 of the video frame selected by user is defined as F3.

At the same time, the frame position corresponding to the start progress position P0 of the target video is defined as F0; the number of highest frame difference values set by user own-self is n.

The first embodiment:

Server acquires n frame difference values which are higher from Label[F0] to Label[F3] in the preset array Label, according to the frame position F3 corresponding to the progress position P3 of the video frame selected by user and the frame position F0 corresponding to the start progress position P0; then the n video frames corresponding to the acquired frame difference values are previewed.

The second embodiment:

Server acquires n frame difference values which are higher from Label[F1] to Label[F3] in the preset array Label, according to the frame position F1 corresponding to the first progress position P1 and the frame position F3 corresponding to the progress position P3 of the video frame selected by user; then the n video frames corresponding to the acquired frame difference values are previewed.

The third embodiment:

Server acquires n frame difference values which are higher from Label[F3] to Label[F2] in the preset array Label, according to the frame position F3 corresponding to the progress position P3 of the video frame selected by user and the frame position F2 corresponding to the second progress position P2; then the n video frames corresponding to the acquired frame difference values are previewed.

And, the form for further previewing the video frame through the topology structure mode can be, a new multi-square matrix preview box which is generated near to the original multi-square matrix preview box; or, a new horizontal or vertical card preview box which is generated near to the horizontal or vertical card preview box.

Through the above technical solution, the present disclosure provides a method for previewing the video through the video frame difference, and previewing the representative video frame is realized, as such user can rapidly locate to the interesting video content, to satisfy user's requirement.

The present disclosure also provides a device for previewing video playback progress.

Figure 7:
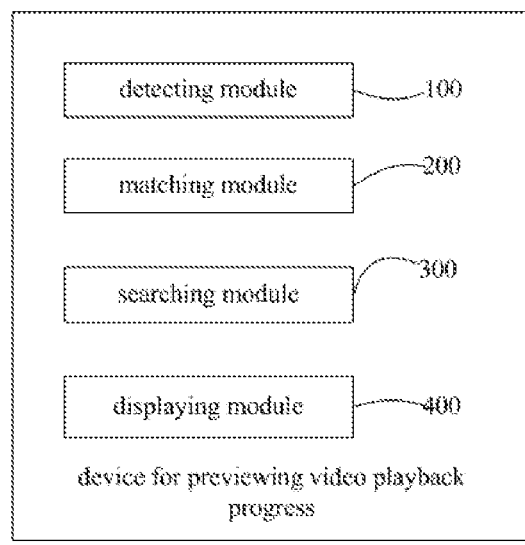
FIG. 7 is a functional module diagram of a device for previewing video playback progress of the present disclosure according to a first exemplary embodiment.

Referring to FIG. 7, the device for previewing video playback progress according to the first exemplary embodiment of the present disclosure, includes:

a detecting module 100, which is configured to detect user's adjusting of progress position to a target video, and acquire an adjusted progress section;

The progress section in the disclosure is a progress position range between a first progress position at the beginning of triggering and a second progress position at the ending of triggering by user, or the progress section is a progress position range between target video's playback start position and a second progress position at the ending of triggering.

a matching module 200, which is configured to match a corresponding progress position range according to the progress section;

a searching module 300, which is configured to search a frame difference value corresponding to each of the video frames contained in the frame position range from a pre-established database, and select a pre-configured number of frame difference values which are relatively higher from the frame difference values, the frame difference value is a difference value between any one video frame and its adjacent video frame, the database storinges the frame difference values corresponding to all of the video frames in the target video.

a displaying module 400, which is configured to display the multiple video frames corresponding to the pre-configured number of frame difference values searched to user in a preview form.

Through the above technical solution, the present disclosure provides a device for previewing the video through the video frame difference, and previewing the representative video frame is realized, as such user can rapidly locate to the interesting video content, to satisfy user's requirement.

Furthermore, in order to preview the video by the video frame difference much better, as an embodiment, the matching module 200 is further configured to match a first frame position according to the first progress position, and match a second frame position according to the second progress position, the frame position range is a range between the first frame position and the second frame position, and the first frame position and the second frame position respectively correspond to a video frame.

Furthermore, in order to preview the video by the video frame difference much better, as an embodiment, the matching module 200 is further configured to match a start frame position according to the playback start position, and match a second frame position according to the second progress position, the frame position range is a range between the start frame position and the second frame position, and the start frame position and the second frame position respectively correspond to a video frame.

Figure 8:
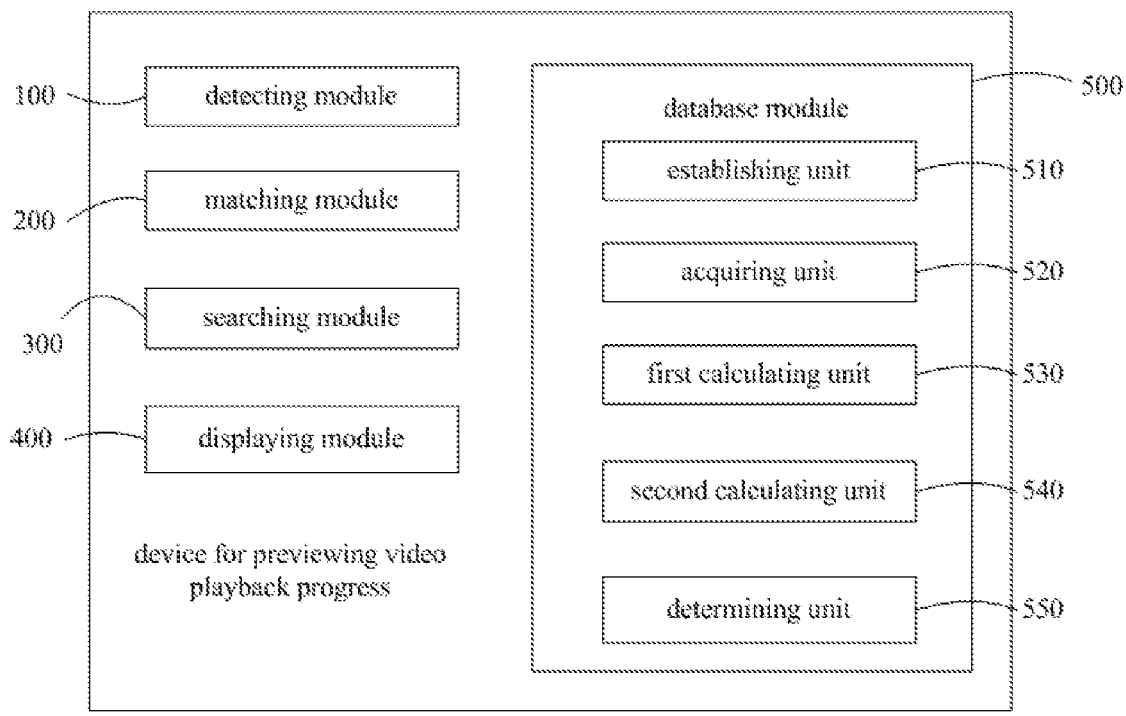
FIG. 8 is a functional module diagram of a device for previewing video playback progress of the present disclosure according to a second exemplary embodiment.

Referring to FIG. 8, based on the device of the first exemplary embodiment shown in FIG. 7, the device for previewing video playback progress according to the second exemplary embodiment of the present disclosure, further includes:

a database module 500, which is configured to establish corresponding database for the target video, the database is a linear array, the length of the linear array is total frames of the video frames contained in the target video.

Furthermore, in order to preview the video by the video frame difference much better, as an embodiment, the database module 500 includes:

an establishing unit 510, which is configured to acquire the total frames of the video frames contained in the target video, establishing a linear array having an initialization of null and a length equal to the total frames of the video frames;

an acquiring unit 520, which is configured to acquire a buffered video frame sequence at the beginning of user playing the target video;

a first calculating unit 530, which is configured to successively calculate an image difference value between each of the video frames and its adjacent video frame in the buffered video frame sequence;

a second calculating unit 540, which is configured to calculate the variance of the image difference value to obtain the corresponding frame difference value, and storing the frame difference value in the linear array; and a determining unit 550, which is configured to determine whether the frame difference value corresponding to each of the video frames in the target video is stored in the linear array; if no, g back to the acquiring unit to calculate the frame difference value repeatedly until the linear array stores the frame difference value corresponding to each of the video frames in the target video.

Furthermore, in order to preview the video by the video frame difference much better, as an embodiment, the displaying module 400 is further configured to display the multiple video frames corresponding to the pre-configured number of frame difference values searched to user in a multi-square preview form or a card preview form.

Each module in the device for previewing the video playback progress correspond to one step in the method embodiment, each function and realizing process are not need to be repeated again.

The foregoing merely portrays some exemplary embodiments of this disclosure and therefore is not intended to limit the patentable scope of the disclosure. Under the inventive concept of this disclosure, any equivalent structural changes based on the specification and accompanying drawings of the disclosure and any direct/indirect applications of the disclosure on other related technical fields shall all be compassed within the patentable scope of protection of the present disclosure.

What is claimed is:

1. A method for previewing video playback progress, comprising:

acquiring the total frames of the video frames contained in the target video, establishing a linear array having an initialization of null and a length equal to the total frames of the video frames;

acquiring a buffered video frame sequence at the beginning of user playing the target video;

successively calculating an image difference value between each of the video frames and its adjacent video frame in the buffered video frame sequence;

calculating the variance of the image difference value to obtain a corresponding frame difference value, and storing the frame difference value in the linear array; and determining whether the frame difference value corresponding to each of the video frames in the target video is stored in the linear array; if no, executing the step of calculating the frame difference value repeatedly; if yes, ending the step of establishing corresponding database for the target video;

detecting user's adjusting of progress position to a target video, and acquiring an adjusted progress section, wherein the progress section is a progress position range between a first progress position at the beginning of triggering and a second progress position at the ending of triggering, or the progress section is a progress position range between a target video's playback start position and a second progress position at the ending of triggering;

matching a first frame position according to the first progress position, and matching a second frame position according to the second progress position, a frame position range being a range between the first frame position and the second frame position, wherein the first frame position and the second frame position respectively correspond to a video frame, or, matching a start frame position according to the playback start position, and matching a second frame position according to the second progress position, a frame position range being a range between the start frame position and the second frame position, wherein the start frame position and the second frame position respectively correspond to a video frame;

searching a frame difference value corresponding to each of the video frames contained in the frame position range from a pre-established database, and selecting a pre-configured number of frame difference values which being relatively higher from the frame difference values, the frame difference value being a difference value between any one video frame and its adjacent video frame, the database storing the frame difference values corresponding to all of the video frames in the target video; and displaying the multiple video frames corresponding to the pre-configured number of frame difference values searched to user in a multi-square preview form or a card preview form.

2. A method for previewing video playback progress, comprising:

acquiring the total frames of the video frames contained in the target video, establishing a linear array having an initialization of null and a length equal to the total frames of the video frames;

acquiring a buffered video frame sequence at the beginning of user playing the target video;

successively calculating an image difference value between each of the video frames and its adjacent video frame in the buffered video frame sequence;

calculating the variance of the image difference value to obtain a corresponding frame difference value, and storing the frame difference value in the linear array; and determining whether the frame difference value corresponding to each of the video frames in the target video is stored in the linear array; if no, executing the step of calculating the frame difference value repeatedly; if yes, ending the step of establishing corresponding database for the target video;

detecting user's adjusting of progress position to a target video, and acquiring an adjusted progress section;

matching a corresponding progress position range according to the progress section;

searching a frame difference value corresponding to each of the video frames contained in a frame position range from a pre-established database, and selecting a pre-configured number of frame difference values which being relatively higher from the frame difference values, the frame difference value being a difference value between any one video frame and its adjacent video frame, the database storing the frame difference values corresponding to all of the video frames in the target video;

displaying the multiple video frames corresponding to the pre-configured number of frame difference values searched to user in a preview form.

3. The method according to claim 2, wherein the progress section is a progress position range between a first progress position at the beginning of triggering and a second progress position at the ending of triggering by user, or the progress section is a progress position range between a target video's playback start position and a second progress position at the ending of triggering; and the step of matching the corresponding progress position range according to the progress section comprises:

matching a first frame position according to the first progress position, and matching a second frame position according to the second progress position, the frame position range is a range between the first frame position and the second frame position, wherein the first frame position and the second frame position respectively correspond to a video frame, or, matching a start frame position according to the playback start position, and matching a second frame position according to the second progress position, the frame position range is a range between the start frame position and the second frame position, wherein the start frame position and the second frame position respectively correspond to a video frame.

4. The method according to claim 2, wherein the step of displaying the plurality of video frames corresponding to the pre-configured number of frame difference values searched to user in the preview form comprises:

displaying the multiple video frames corresponding to the pre-configured number of frame difference values searched to user in a multi-square preview form or a card preview form.

5. A device for previewing video playback progress, comprising one or more processors and a non-transitory program storage medium storing program code executable by the one or more processors, the program code comprising:

an establishing unit, configured to acquire the total frames of the video frames contained in the target video, establish a linear array having an initialization of null and a length equal to the total frames of the video frames;

an acquiring unit, configured to acquire a buffered video frame sequence at the beginning of user playing the target video;

a first calculating unit, configured to successively calculate an image difference value between each of the video frames and its adjacent video frame in the buffered video frame sequence;

a second calculating unit, configured to calculate the variance of a image difference value to obtain the corresponding frame difference value, and store the frame difference value in the linear array; and a determining unit, configured to determine whether the frame difference value corresponding to each of the video frames in the target video is stored in the linear array;

if no, executing the step of calculating the frame difference value repeatedly; if yes, ending the step of establishing corresponding database for the target video;

a detecting module, configured to detect user's adjusting of progress position to a target video, and acquire an adjusted progress section;

a matching module, configured to match a corresponding progress position range according to the progress section;

a searching module, configured to search a frame difference value corresponding to each of the video frames contained in a frame position range from a pre-established database, and select a pre-configured number of frame difference values which being relatively higher from the frame difference values, the frame difference value being a difference value between any one video frame and its adjacent video frame, the database storing the frame difference values corresponding to all of the video frames in the target video; and a displaying module, configured to display the multiple video frames corresponding to the pre-configured number of frame difference values searched to user in a preview form.

6. The device according to claim 5, wherein the progress section is a progress position range between a first progress position at the beginning of triggering and a second progress position at the ending of triggering by user, or the progress section is a progress position range between target video's playback start position and a second progress position at the ending of triggering; and the matching module, further configured to match a first frame position according to the first progress position, and match a second frame position according to the second progress position, the frame position range is a range between the first frame position and the second frame position, wherein the first frame position and the second frame position respectively correspond to a video frame, or, match a start frame position according to the playback start position, and match a second frame position according to the second progress position, the frame position range is a range between the start frame position and the second frame position, wherein the start frame position and the second frame position respectively correspond to a video frame.

7. The device according to claim 5, wherein the displaying module, further configured to display the multiple video frames corresponding to the pre-configured number of frame difference values searched to user in a multi-square preview form or a card preview form.

* * * * *